United States Patent [19]

Hauenstein

[11] 4,182,841

[45] Jan. 8, 1980

[54] COMPOSITION OF COPOLYESTERS

[75] Inventor: Jack D. Hauenstein, Stow, Ohio

[73] Assignee: The Goodyear Tire & Rubber Company, Akron, Ohio

[21] Appl. No.: 914,643

[22] Filed: Jun. 12, 1978

[51] Int. Cl.² ............................................. C08G 63/76
[52] U.S. Cl. ..................................... 525/437; 528/309
[58] Field of Search ...................... 528/273, 272, 309

[56] References Cited

U.S. PATENT DOCUMENTS

| | | | |
|---|---|---|---|
| T954,005 | 1/1977 | Davis et al. | 264/98 |
| 3,673,139 | 6/1972 | Hrach | 528/272 |
| 3,814,786 | 6/1974 | Gall et al. | 528/309 |
| 3,822,332 | 7/1974 | Hrach | 528/309 |
| 3,931,114 | 1/1976 | Gall et al. | 528/309 |
| 3,953,404 | 4/1976 | Borman | 528/273 |

Primary Examiner—Lucille M. Phynes
Attorney, Agent, or Firm—J. P. Ward

[57] ABSTRACT

This invention relates to copolyesters for making containers by blow molding. The copolyesters are crosslinked just short of network formation to the point of forming gel to improve the strength of the copolyesters in molten state to the point that a pre-form maintains its shape and size and does not sag at molding temperature.

4 Claims, No Drawings

COMPOSITION OF COPOLYESTERS

This invention relates to copolyester resins for use in the manufacture of plastic containers by blow molding, and to containers manufactured from these copolyesters.

The manufacture of plastic containers such as bottles by the reheat blow molding (RHB) process is well known. In that process a highly crystallizable polymer such as a high molecular weight polyethylene terephthalate is generally used. The RHB process is a two step procedure in which a test tube shaped preform is made in the first step and this preform in a second step is subjected to a separate reheating and stretch blowing to form a bottle. The bottles formed are biaxially oriented and have excellent toughness, high strength and resistance to creep. They are suitable for use as containers for materials under moderate pressure such as carbonated beverages.

The present invention is concerned with the extrusion blow molding process. Bottles made by this process are generally for nonpressurized containers. The polymer generally used in the RHB process is not ordinarily used in the extrusion blow molding process because it does not have sufficient melt strength at processing temperatures to maintain integrity of the extruded preform.

According to the present invention it has been found that a polyester homopolymer or copolymer such as an 88/12 ethylene glycol, neopentyl glycol terephthalate modified with up to 0.62 parts per thousand of a modifying material that increases the melt viscosity and strength of a molten polymer, has increased melt viscosity at low shear rates and a hot parison or preform maintains its integrity so that it can be blown to form bottles with excellent appearance. These bottles are useful as containers.

Various modifying agents that increase the melt viscosity and strength of copolymer in molten state can be used to impart the properties needed in the polyesters. These agents must be used in proper amounts. They are polyfunctional materials having more than two reactive functional groups. Representative examples of such materials are polyglycols such as pentaerythritol, glycerine, 2-hydroxymethyl 1,3-propanediol, polycarboxylic compounds such as trimellitic acid, pyromellitic acid or its anhydride, 1,2,3-propane tricarboxylic acid and compounds containing both carboxyl and hydroxyl groups.

A sufficient amount of the modifying agent should be incorporated in the polymer molecule to increase the strength of the copolymer in molten state to the point that a preform will maintain its shape and size while molten at atmospheric pressure and that it will not sag at molding temperature.

U.S. Pat. No. 3,931,114 relates to blow molded articles of polybutylene terephthalate and discloses that when the intrinsic viscosity of the resin is 1.05 or higher the melt strength of the resin at temperatures slightly above the melting point of the resin is sufficient that the resin can be shaped by blow molding and such blow molded articles are strong enough to be used in bottles and other containers.

Defensive Publication T 954,005 also relates to blow molded articles and discloses that the incorporation of from 0.05 to 0.3 mol percent of a polyfunctional branching compound in an ethylene glycol-cyclohexane dimethanol terephthalate copolyester increases the melt strength of these copolyesters to the extent that they can be used in blow molding. This publication further discloses that the polyfunctional branching compound can produce a nonuniform gel in the copolyester which can be regulated or controlled by the use of a chain terminator such as a monofunctional acid, ester or alcohol at the proper level.

We have found that when the theoretical gelation concentration as determined by the following formula $$\frac{\text{concentration of functional groups in the system}}{\text{number of end groups in the polymer}}$$

is equal to 1, gel is formed in the polymer and lumps and fish eyes form in products made from the polymer. When the amount of modifying agent incorporated in the polymer is about the amount required to form crosslinks equal to one-third of the critical branching concentration causing gelation in the polymer, the polymer is suitable for use in the blow molding of bottles and the use of a molecular weight regulator or chain terminator is not needed. In a copolymer such as the 88/12 ethylene glycol-neopentyl terephthalate copolymer the amount is 0.62 parts of a crosslinking material such as pentaerythritol per 1000 parts of copolymer.

Polyester suitable for use in this invention when modified according to the invention are the linear thermoplastic homopolyesters having melting points in the range of 190°–230° C. and copolyesters having melting points in this temperature range. A representative example of these homopolyesters is polybutylene terephthalate. Representative examples of copolyesters are the ethylene glycol-neopentyl glycol terephthalate copolymers wherein the bound ratio of ethylene to neopentyl structural units ranges from 70/30 to 80/20 and the ethylene terephthalate-isophthalate copolyesters.

Thus it has been found that a polyester copolymer such as an 88/12 ethylene glycol, neopentyl glycol terephthalate modified with up to 0.62 parts per thousand of a crosslinking material such as pentaerythritol that increases the melt viscosity and strength of the molten polymer has increased melt viscosity at low shear rates and a hot parison or preform maintains its integrity so that it can be blown to form bottles with excellent appearance. These bottles are useful as containers.

Various modifying agents that increase the melt viscosity and strength of copolymer in molten state can be used to impart the properties needed in the copolyesters. These agents must be used in proper amounts. They are polyfunctional materials having more than two reactive functional groups. Representative examples of such materials are polyglycols such as pentaerythritol, glycerine, 2-hydroxymethyl 1,3-propanediol, polycarboxylic compounds such as trimellitic acid, pyromellitic acid or its anhydride, 1,2,3-propane tricarboxylic acid and compounds containing both carboxyl and hydroxyl groups.

A sufficient amount of the modifying agent should be incorporated in the polymer molecule to increase the strength of the copolymer in molten state to the point that a preform will maintain its shape and size while molten at atmospheric pressure and so that it will not sag at molding temperature.

The following examples in which parts and percentages are by weight unless otherwise indicated illustrate the invention.

The critical concentration of multifunctional groups is defined by Flory on pages 351 and 353 of "Principles of Polymer Chemistry". A basic equation of probability defines boundary conditions for using branching agents.

EXAMPLE 1

23.5 pounds of dimethyl terephthalate, 14.5 pounds ethylene glycol, 3.35 pounds neopentyl glycol and a manganese catalyst in the amount of 0.076 parts per thousand of manganese are added to a stirred reactor. The contents are heated to 220° C. and reacted until all the methanol has been removed. At this point pentaerythritol 0.0160 pound (0.64 parts per thousand) and antimony (0.21 parts per thousand as antimony catalyst are added and allowed to react a few moments to incorporate the pentaerythritol. Vacuum is then applied to give a pressure less than 0.5 mm Hg and the temperature increased to 275° C. After 3.0 hours at these conditions a polymer is formed having an intrinsic viscosity of 0.80 in 60/40 phenol/tetrachloroethane solvent at 30° C. and a melting point of 204° C.

This polymer could be extrusion blow molded into bottles by the processes described. The polymer process temperatures used are 430° F.

EXAMPLE 2

Using the same procedure as Example 1 and the same raw materials charge the polymerization time is reduced to two hours. The resulting polymer had an intrinsic viscosity of 0.60. This product could not be extrusion blow molded. Its melt viscosity and melt strength were too low to make a melt stable parison.

EXAMPLE 3

Using the same procedure and raw materials charge except that 0.008 pound (0.32 parts per thousand) of pentaerythritol is added instead of the amount in Example 1. The vacuum and temperature 275° C. were applied for 4.0 hours. A polymer is formed having an intrinsic viscosity of 1.0 and a melting point of 207° C.

This product could be extrusion blow molded and bottles of uniform thickness formed. However, the viscosity was such that it was difficult to accumulate sufficient melt for parison formations without exceeding the power capabilities of the equipment.

EXAMPLE 4

Using the same procedure and raw material charge as Example 1 except that no pentaerythritol was added. After 3.5 hours a polymer was formed having an intrinsic viscosity of 0.85.

This product had insufficient melt strength to be extrusion blow moldable into bottles.

Extrusion Blow Molding Process

In extrusion blow molding the basic steps (as indicated in FIG. 1) include:
1. Melting the branched polyester copolymer in an extruder.
2. Forming the molten melt in the shape of a hollow tube via a die head tubing. This is known as forming the parison.
3. Engaging and clamping the parison between the two mold halves once a sufficient melt length is achieved.
4. Blowing the parison via a blow pin by means of a fluid usually air to the shape of the mold.
5. Maintaining the fluid pressure inside the container for a period of time such that the expanded parison will remain in intimate contact with the mold surface in order to cool and solidify the material.
6. Removing the thus molded object from the mold or blow pin by some mechanical means.
7. Subsequent post operation such as trimming flash or excess material and/or printing.

Equipment available is of two types for parison formation: (1) continuous extrusion; and (2) intermittent extrusion.

I. Continuous Extrusion

The continuous extrusion process employs an extruder with a rotating screw. The screw pumps the melted polymer into the blow molding cooling head at a continuous and uniform slow rate, keeping pace with the sequence of molding operations. The molten parison, in this case, is produced from the die without interruption. Usually the mold will travel to the melt parison, engage it and immediately withdraw (even before blowing is initiated) to permit the continued extrusion of another parison. Continuous extrusion is normally employed in the production of smaller sizes such as 6 ounce containers to one gallon capacities.

II. Intermittent Extrusion

Intermittent extrusion becomes increasingly necessary as products become larger and heavier. The intermittent formation of parisons is achieved in two ways: (1) a reciprocating screw extruder; and (2) a ram accumulator.

A. Reciprocating Screw Extruders

Reciprocating screw extruders are systems similar to injection molding. When a predetermined amount of molten resin has been accumulated the screw moves forward forcing the melt through the die head. Once it reaches sufficient length the mold closes, engaging the parison, then directly blows the tube to the mold configuration via the blow pin. In this case the mold halves remain permanently under the die head tooling. Once the mold halves open the part is ejected and another parison is injected between the open mold halves. The cycle begins again.

B. Ram Accumulator

The function of the ram accumulator is to accumulate and hold in readiness the volume of melted plastic to make the next part. This is essential for blow molding large items weighing over 5 pounds. In this case a ram of some type rather than the screw will inject a hollow tube parison between the mold halves. Otherwise the process is the same as reciprocating screw extruders.

The examples above illustrate the invention. The invention provides new copolyesters that are suitable for the manufacture of bottles and other containers by blow molding. The products are free from lumps of gel and fish eyes. Containers made from the copolyesters are clear and have excellent transparency even when colored by a coloring agent.

While certain representative embodiments and details have been shown for the purpose of illustrating the invention, it will be apparent to those skilled in this art that various changes and modifications may be made therein without departing from the spirit or scope of the invention.

What is claimed is:

1. A composition selected from the group consisting of polyethylene terephthalate homopolyester and ethylene terephthalate/neopentyl terephthalate copolyester wherein the bound ratio of ethylene to neopentyl structural units in said copolyester ranges from 70/30 to 80/20, said composition containing a polyfunctional compound having more than two reactive functional groups in an amount sufficient to provide cross link sites in said composition equivalent to one-third of the theoretical gelation concentration of said composition to increase the melt viscosity and strength thereof in the molten state.

2. The composition of claim 1 in which the cross linking material is selected from the group consisting of glycols selected from pentaerythritol, glycerine, 2-hydroxymethyl 1,3-propanediol, polycarboxylic compounds selected from trimelletic acid, pyromellitic acid, pyromellitic dianhydride, 1, 2, 3-propane tricarboxylic acid.

3. The composition of claim 1 wherein the said composition is ethylene terephthalate/neopentyl terephthalate copolyester.

4. The copolyester of claim 3 wherein the mol percent charge ratio of ethylene glycol and neopentyl glycol used in the preparation of the copolyester is 88/12.

* * * * *